C. E. AKELEY.
FILM CUTTER FOR MOTION PICTURE CAMERAS.
APPLICATION FILED APR. 27, 1916.
1,232,418.
Patented July 3, 1917.
2 SHEETS—SHEET 1.
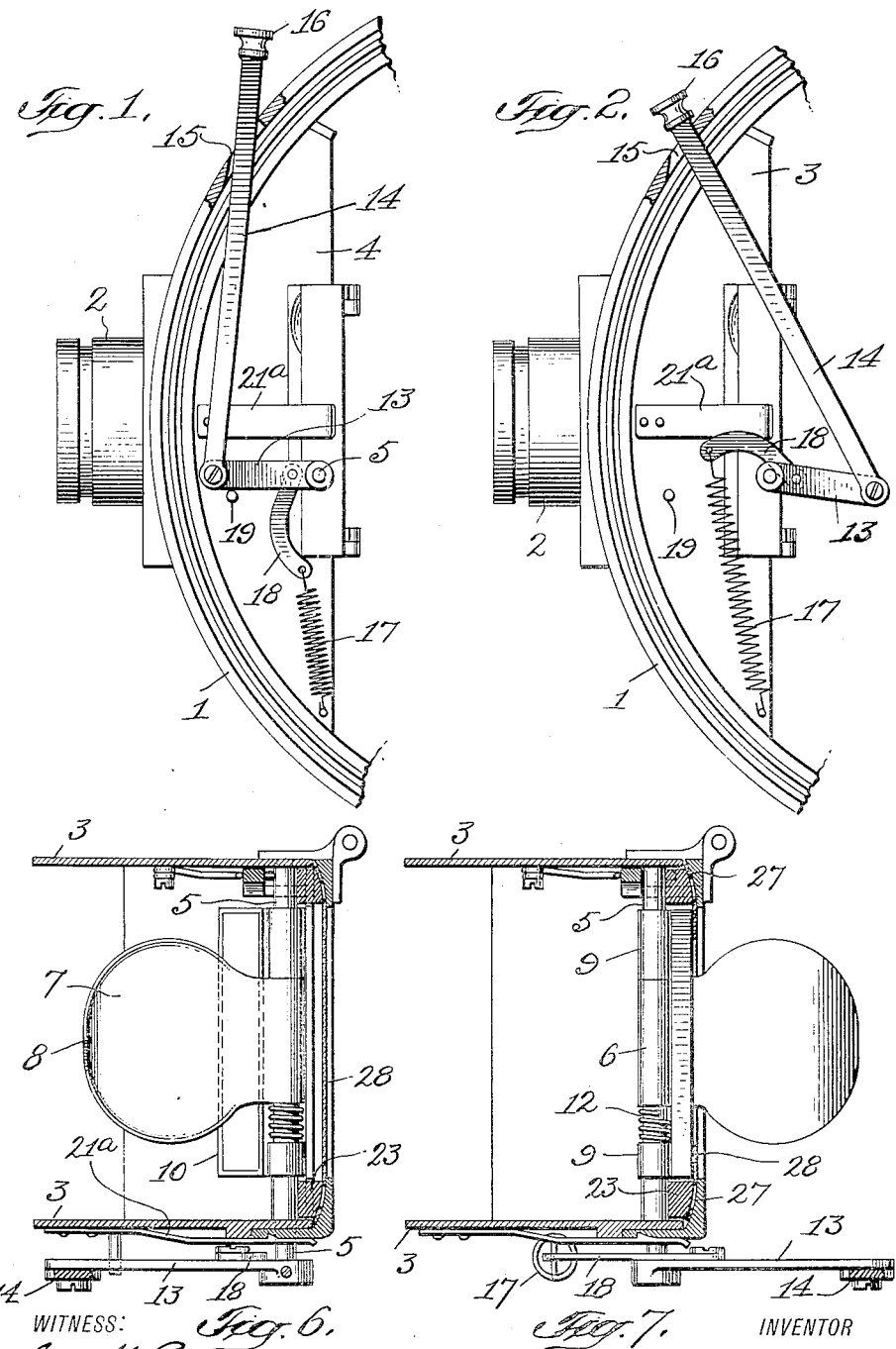
WITNESS:
INVENTOR
Carl E. Akeley
by Percy B. Hills
ATTORNEY

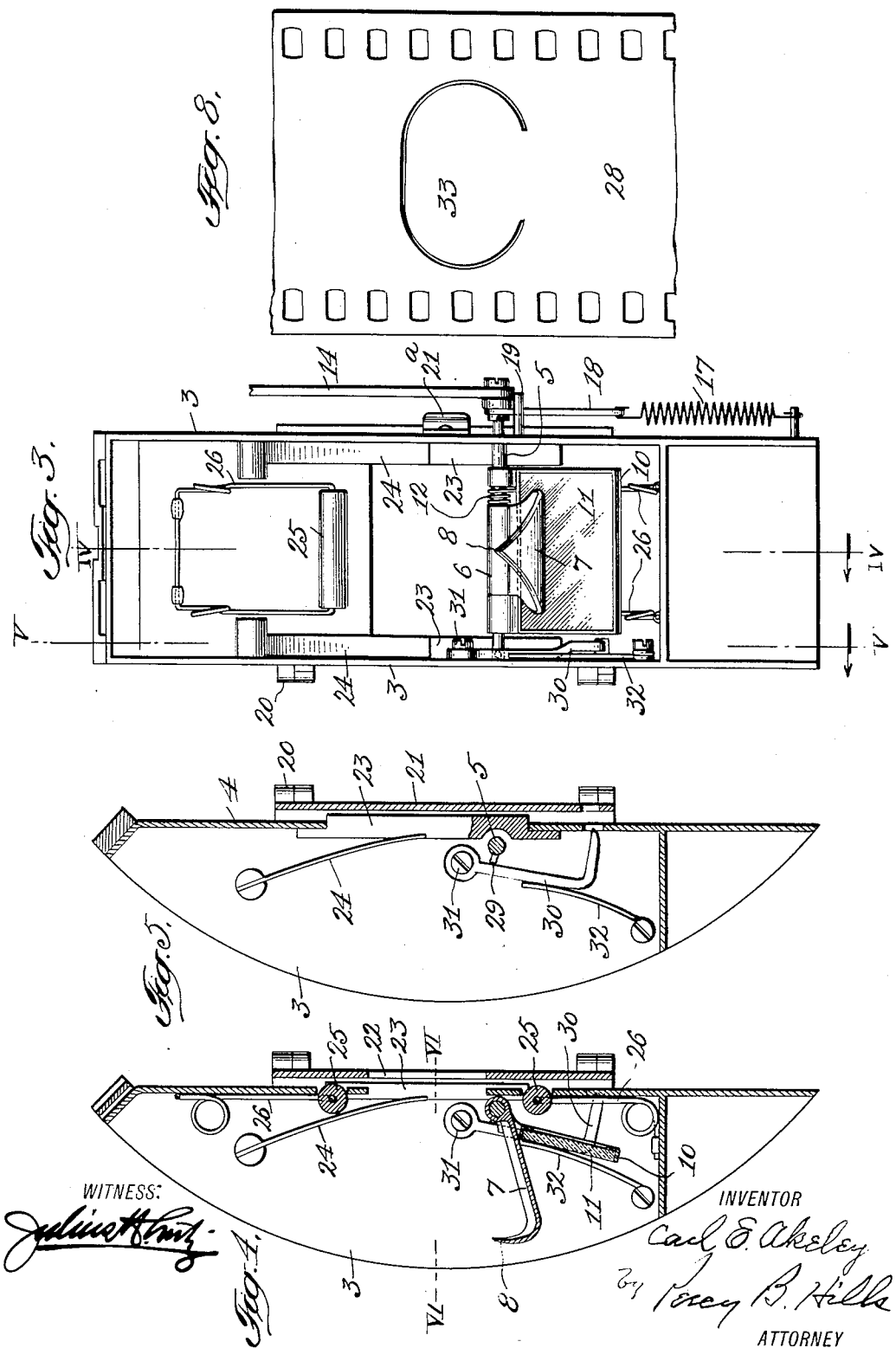

UNITED STATES PATENT OFFICE.

CARL E. AKELEY, OF NEW YORK, N. Y., ASSIGNOR TO AKELEY CAMERA, INC., OF NEW YORK, N. Y., A CORPORATION OF NEW YORK.

FILM-CUTTER FOR MOTION-PICTURE CAMERAS.

1,232,418.  Specification of Letters Patent.  Patented July 3, 1917.

Application filed April 27, 1916. Serial No. 93,929.

*To all whom it may concern:*

Be it known that I, CARL E. AKELEY, a citizen of the United States, residing at New York, in the borough of Manhattan, city of New York, and State of New York, have invented certain new and useful Improvements in Film-Cutters for Motion-Picture Cameras, of which the following is a specification.

My invention relates to motion picture cameras, particularly adapted for use in conjunction with that type of camera disclosed in Letters Patent No. 1,181,201, granted May 2, 1916, to Akeley Camera, Inc., as my assignee, and has for its object to provide mechanism for cutting a tongue or flap in the film when desired, said cutter preferably being associated with a suitable screen, which is brought in position at the point of exposure when the cutter completes its cutting operation to register with the aperture formed by the cutter, the tongue thus cut in the film being bent outwardly automatically by the cutter as the screen is brought to position for observation.

My invention also embodies certain other minor details of construction, as will be pointed out hereinafter and more fully set forth and claimed.

In the accompanying drawings:—

Figure 1 is a sectional view of a portion of a circular camera casing with one side wall thereof removed, showing the operating mechanism for my improved cutter and its parts, said mechanism being shown in its normal inoperative position.

Fig. 2 is a view similar to Fig. 1, showing the operating mechanism shifted to the opposite extreme of its movement, that is to say, to the position where the cutting of the film has been completed.

Fig. 3 is a rear elevation of the film guide detached from the camera casing.

Fig. 4 is a vertical transverse sectional view taken on the line IV—IV of Fig. 3.

Fig. 5 is a view similar to Fig. 4 taken on the line V—V of Fig. 3.

Fig. 6 is a transverse sectional view taken on the line VI—VI of Fig. 4.

Fig. 7 is a view similar to Fig. 6, showing the cutter shifted to a position where it has completed its cut, that is to say, with the parts in the position shown in Figs. 2 and 7.

Fig. 8 is a face view of a piece of the film, showing the cut in the same formed by the film tongue cutter.

Similar numerals of reference denote corresponding parts in the several views.

In the said drawings, the reference numeral 1 denotes the casing of a circular camera, provided with the usual lens tube 2 for producing a series of pictures on an intermittently advanced film. Detachably fastened in said casing back of the lens tube 2 is a film guide comprising side plates 3 curved along their front edges to conform to the contour of the interior of the casing 1, and a back plate 4, which is apertured centrally to permit the taking of pictures, it being understood that the film passes downwardly along the rear surface of said back plate 4. Fixed upon a transverse shaft 5 mounted in the side plates 3 is the hub 6 of a curved cutter 7, the latter being comparatively broad, and being provided with an upturned cutting point 8, as best seen in Figs. 4 and 6. Also rotatably mounted on said shaft 5 are the separated hubs 9 of a frame 10, the latter carrying a ground glass screen 11 of the usual construction. A spring 12 coiled about the shaft and bearing against the back of the frame 10 causes said frame and its screen to follow the rotary movement of the cutter 7, but permits a slight independent movement to said cutter when said frame 10 reaches a vertical position in the exposure orifice in the back plate 4, so that said cutter 7 may have said slight independent movement at the end of the stroke of its operating mechanism. The said shaft 5 has one of its ends projecting to the outer side of one of the side plates 3, and has fixed to said end an arm 13, to the outer end of which is pivoted a rod 14, which extends through an aperture 15 in the casing 1 and terminates in a head 16. A spring 17 attached to the side plate 3 and preferably to an arm 18, which is pivoted to the arm 13, exerts a constant tension upon said arm 13 and the shaft 5 to . tract the cutter 7 to the position shown in Fig. 4, a stop pin 19 in the side wall 3 limiting the movement of the arm 13 in this direction.

Hinged at 20 to the film guide formed by the side plates 3 and back plate 4 is a film guide gate 21, between which and the back plate 4 the film passes, said gate being apertured at 22 to register with the exposure aperture in the back plate 4, and being retained in its closed position by a spring latch 21ᵃ fixed to one of the side plates 3, as shown. Loosely mounted in the back plate 4 on each side of the exposure aperture therein are vertically disposed presser plates 23, the same being yieldably retained in position by means of springs 24 fixed to the side plates 3, and being so disposed as to register with the perforated edges of the film. Also mounted above and below the exposure aperture in the back plate 4, in horizontal slots therein, are anti-friction rollers 25, the same being spring-pressed to operative position by means of springs 26, in a manner readily understood. The vertical edges of the film guide gate 21 along their inner surfaces are curved slightly at 27, as best seen in Figs. 6 and 7, and the presser plates 23 are similarly curved, the result being that the vertical edges of the film 28 passing therebetween are correspondingly curved, which causes a slight curvature in the same direction all the way across the film, and consequently maintains the front gelatinized face of the film away from the back plate 4, thereby preventing accidental scratching of the same. And in the event that there is any slight contact of the front face of the film this is received upon the anti-friction rollers 25 and the scratching minimized.

Fixed to the shaft 5 at one side is a pin 29, which is adapted normally to contact with and maintain a hook 30, pivoted at 31, in the position shown in Fig. 5 against the tension of the spring 32. But when the shaft 5 is rotated to move the cutter 7 to cutting position, as shown in Fig. 7, the pin 29 will release the hook 30, and the lower free end of the latter will be projected, by spring 32, through registering apertures in the back plate 4 and gate 21. Inasmuch as the perforations in one edge of the film in its passage through the device register with these apertures in the back plate and gate, the end of the hook 30 will enter one of said film apertures, thereby positively retaining the film against movement during the operation thereon of the cutter 7, said hook being withdrawn automatically as the cutter returns to its normal inoperative position, through the contact with said hook of pin 29.

From the above description the operation of my improved construction will be understood to be as follows:—With the operating mechanism in the position shown in Fig. 1, the cutter 7 will be in the position shown in Figs. 3 and 4, that is to say, disposed below and away from the exposure aperture in the plate 4, and the screen 11 will be disposed below said cutter. But upon raising the rod 14 through the knob 16 and rotating the arm 13 in substantially a half circle to the position shown in Fig. 2, the shaft 5 will be correspondingly rotated, which will turn the cutter 7 correspondingly to the position shown in Fig. 7. But in its passage to this position, said cutter will contact with the film 28 and will cut therein the oval flap 33, best seen in Fig. 8. In its further movement through the film 28, said cutter will carry said flap 33 with it and will bend it to substantially a horizontal position, thereby leaving an unobstructed aperture through the film registering with the aperture 22 in the gate 4. This movement of the shaft 5 has also rotated the screen 11, and as the cutter approaches its extreme of movement to the right, the frame 10 of said screen will register with the exposure aperture in the back plate 4, thereby completely closing said aperture, and bringing the ground glass screen 11, in position for reproducing the image presented by the camera lens. And the spring connection between said frame 10 and the cutter 7, hereinbefore described, will permit the described independent movement which is desirable in order that the screen frame 10 may come to position properly and without unnecessary jar. With the parts in this position, the image received by the camera lens is projected upon the screen 11 and may be inspected in the usual manner from the rear, thereby giving a perfect image at the exact point where the pictures are taken. The return of the cutter 7 to its normal position at the same time retracts the screen 11 and permits the flap 33 to spring of its own resiliency to its initial position, closing the aperture in the film and in no way interfering with the subsequent feed of the film, it being understood that this movement of the parts to inoperative position automatically retracts the hook 30 and releases the film for further feed.

The cutting and bending of the flap 33 in the film, as hereinbefore described, affords a means of inspecting the object to be photographed through the film, and said flap also provides a mark upon the film which has been found desirable heretofore, and which has been produced by separate punching or marking mechanism, the mark produced by cutting the flap 33 being one that cannot be missed in inspecting the film.

While I have shown and described my improved devices as applied to a camera of the type described in my Letters Patent hereinbefore referred to, it is obvious that my improved mechanism may be applied to cameras of different constructions.

Having thus described my invention, what I claim as new and desire to secure by Letters Patent, is:—

1. A motion picture camera provided with a cutter adapted to cut a tongue or flap in the film at the point of exposure.

2. A motion picture camera provided with a cutter adapted to cut a tongue or flap in the film at the point of exposure and to bend said tongue or flap out of line of the lens projection 3. In a motion picture camera, a cutter pivoted therein in position to be rotated to cut a tongue or flap in the film at the point of exposure.

4. In a motion picture camera, a cutter pivoted therein in position to be rotated to cut a tongue or flap in the film at the point of exposure and to bend said tongue or flap out of the line of the lens projection.

5. In a motion picture camera, means for cutting a tongue or flap in the film at the point of exposure and for bending said tongue or flap out of the line of the lens projection, and means for moving a screen into the line of the lens projection at the point where said tongue or flap is cut.

6. In a motion picture camera, a common means for cutting a tongue or flap in the film at the point of exposure for bending said tongue or flap out of the line of the lens projection, and for moving a screen into the line of the lens projection at the point where said tongue or flap is cut.

7. In a motion picture camera, a cutter pivoted therein and adapted to be rotated to cut a tongue or flap in the film at the point of exposure and to bend the same out of line of the lens projection, and a screen movable with said cutter and adapted to be brought into the line of the lens projection as said cutter completes its cutting and bending stroke.

8. In a motion picture camera, a cutter pivoted therein and adapted to be rotated to cut a tongue or flap in the film at the point of exposure and to bend the same out of line of the lens projection, a screen movable with said cutter and adapted to be brought into the line of the lens projection as said cutter completes its cutting and bending stroke, and a spring for retracting said cutter and screen to their normal inoperative position.

9. In a motion picture camera, a cutter pivoted therein and adapted to be rotated to cut a tongue or flap in the film at the point of exposure and to bend the same out of line of the lens projection, a screen movable with said cutter and adapted to be brought into the line of the lens projection as said cutter completes its cutting and bending stroke, and means for permitting a spring yield to said screen with respect to said cutter when said screen reaches the limit of its movement.

10. In a motion picture camera, a cutter pivoted therein and adapted to be rotated to cut a tongue or flap in the film at the point of exposure and to bend the same out of line of the lens projection, a screen movable with said cutter and adapted to be brought into the line of the lens projection as said cutter completes its cutting and bending stroke, means for permitting a spring yield to said screen with respect to said cutter when said screen reaches the limit of its movement, and a spring for retracting said cutter and screen to their normal inoperative position.

11. In a motion picture camera, means for cutting a tongue or flap in the film at the point of exposure, and means for maintaining said film against movement during said cutting operation.

12. In a motion picture camera, means for cutting a tongue or flap in the film at the point of exposure and for bending said tongue or flap out of the line of the lens projection, and means for maintaining said film against movement during said cutting and bending operation.

13. In a motion picture camera, a cutter for cutting a tongue or flap in the film at the point of exposure, means for operating said cutter, and means controlled by said operating means for retaining the film against movement during said cutting operation.

14. In a motion picture camera, a cutter for cutting a tongue or flap in the film at the point of exposure, a shaft for operating said cutter, a spring-pressed hook adapted when projected to engage one of the perforations in the film edge to prevent movement of the latter, and means on said shaft for normally retaining said hook out of said engagement 15. In a motion picture camera, a cutter for cutting a tongue or flap in the film at a point of exposure, a shaft for operating said cutter, a pivoted hook adapted when projected to engage one of the perforations in the film edge to prevent movement of the latter, a spring pressing said hook toward said engaged position, and a stud on said shaft adapted when said shaft is in its normal inoperative position to retract said hook against the tension of said spring but to release said hook when said shaft is rotated to operate said cutter.

In testimony whereof I hereunto set my hand this 26th day of April, 1916.

CARL E. AKELEY.